March 20, 1945.    L. KECSKEMETI    2,371,626

SPEED INDICATING APPARATUS

Filed Feb. 19, 1942    5 Sheets-Sheet 1

INVENTOR
Ladislaus Kecskemeti

March 20, 1945. L. KECSKEMETI 2,371,626
SPEED INDICATING APPARATUS
Filed Feb. 19, 1942 5 Sheets-Sheet 2

INVENTOR:
Ladislaus Kecskemeti
BY
his agent

March 20, 1945.　　　L. KECSKEMETI　　　2,371,626
SPEED INDICATING APPARATUS
Filed Feb. 19, 1942　　　5 Sheets-Sheet 3

INVENTOR:
Ladislaus Kecskemeti
BY
his agent

March 20, 1945.   L. KECSKEMETI   2,371,626
SPEED INDICATING APPARATUS
Filed Feb. 19, 1942   5 Sheets-Sheet 5

INVENTOR:
Ladislaus Kecskemeti
BY
his agent

Patented Mar. 20, 1945

2,371,626

UNITED STATES PATENT OFFICE 2,371,626

SPEED INDICATING APPARATUS

Ladislaus Kecskeméti, New York, N. Y., assignor, by mesne assignments, to M. H. Avram, New York, N. Y.

Application February 19, 1942, Serial No. 431,486

11 Claims. (Cl. 175—183)

My invention relates to an apparatus for ascertaining characteristics of motion of a moving body, particularly an airplane.

My invention is more particularly concerned with an apparatus for continuously furnishing direct readings of speed variations, i. e., the rate of acceleration and deceleration, fore and aft velocity, lateral velocity due to side drift, true velocity and true direction of movement, as well as for furnishing readings showing the angles of fore and aft and lateral inclination of the moving body. This moving body may be any air- or water-craft or any vehicle travelling on land; however, as mentioned above, my new apparatus is especially adapted for aeronautical purposes.

It is an object of the present invention to provide an apparatus adapted to fulfill all above requirements with high sensitivity and being nevertheless of such mechanical sturdiness as is satisfactory for use in various vehicles, as for instance aircraft.

It is a further object to provide an apparatus which has a minimum of moving mechanical parts and in which all components and factors adapted to introduce errors have been either eliminated or neutralized. Briefly stated, my new apparatus comprises means adapted to create in an electrical oscillatory circuit frequency variations being proportional to velocity variations of the moving body and an integrating device adapted to determine the integrated products of these velocity variations with respect to time and to indicate the thus integrated products; the same are then a measure of the velocity of the moving body.

At least two systems of such means responsive to acceleration and deceleration and two integrating devices have to be built into the moving vehicle, e. g. aircraft: Means responsive to longitudinal acceleration and deceleration, to give fore and aft velocity and means responsive to lateral acceleration and deceleration to give sidewise speed, i. e. drift of the aircraft; the entire arrangement also has to include a device to add these two components of speed and to show the true speed and the true direction of motion relative to the longitudinal center line of the craft. A part of the apparatus, namely the gyroscope carrying the means responsive to velocity variations, may be used for operating one or more inclinometers in order to furnish readings of the angles of fore and aft and lateral inclinations of the aircraft.

It should be noted that my apparatus neglects differences in elevation of the moving body but gives the horizontal component only of motion, speed and distances; in other words, the apparatus ignores ascending and descending movement of the aircraft. However, it should be emphasized that it would easily be possible to adapt my new apparatus to indicate not only fore and aft and lateral speed, i. e. speed in a horizontal plane, but also speed of the aircraft in a vertical plane so as to have a measure for the ascending and descending speed of the plane.

My invention will be best understood by reference to the following description when taken in connection with the accompanying drawings of illustrative embodiments thereof, while its scope will be more particularly pointed out in the appended claims.

My new apparatus comprises means for translating velocity variations of the airplane into variations of the characteristics of an electrical element being proportional to these velocity variations, means adapted to create in an oscillatory circuit frequency variations being proportional to the variations of the characteristics of the above mentioned electrical element, and an integrating mechanism adapted to integrate these frequency variations with respect to time. Naturally, means have also to be provided for indicating the thus obtained integrated products of these frequency variations and time; these integrated products are then a measure of the velocity of the airplane.

It should be noted that the specific function which each of the elements of my new apparatus has to fulfill, may be carried out by various means; therefore in the following description only preferred embodiments will be described; the same proved to be especially advantageous in operation.

Figure 1:
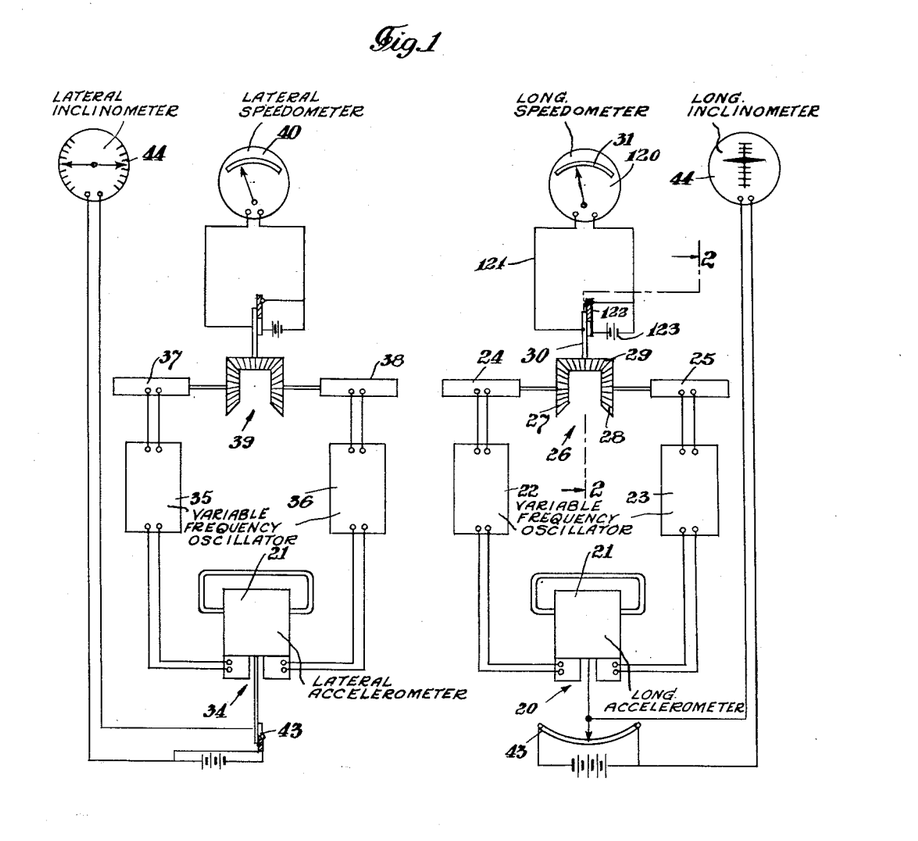
Fig. 1 is a diagrammatic view of the entire arrangement.

As shown in Fig. 1 the accelerometer 20, i. e., the device for translating velocity variations of the airplane into variations of the characteristics of an electrical element, is carried by a gyroscope 21. The indications, i. e., electrical impulses of accelerometer 20 are transmitted to so-called "frequency controlling means" 22, i. e., means adapted to create in an oscillatory circuit frequency variations proportional to the variations of the characteristics of the electrical element forming part of accelerometer 20.

As shown in this figure, I provide two frequency controlling means 22 and 23, one of which creates in an oscillatory circuit frequency variations proportional to the rate of acceleration of the plane in a certain direction, and the other in another oscillatory circuit frequency variations proportional to the rate of deceleration of the plane in the same direction. Synchronous motors, so-called "phonic wheels" 24 and 25, are controlled by the frequency controlling means 22 and 23 respectively, in such a way that the speed of each of these motors varies in accordance with the frequency variations of the respective oscillatory circuit.

An integrating differential arrangement 26 serves for integrating the frequency variations of both oscillatory circuits with respect to time; this differential arrangement consists of two bevel gears 27 and 28, driven by the phonic wheels 24 and 25 respectively, and the planet wheel 29, which is in mesh with gears 27 and 28. It should be mentioned that the accelerometer 20 has to act in such a manner that frequency variations in one or the other of the oscillatory circuits are only created if velocity variations of that type occur by which the respective oscillatory circuit is controlled: this means that the frequency of the oscillatory circuit controlled by the rate of acceleration remains constant in case of deceleration of the airplane, and the frequency of the oscillatory circuit controlled by the rate of deceleration remains constant in case of acceleration of the plane. This has the consequence that at the time when the speed of one of the phonic wheels changes, i. e., increases, the speed of the other phonic wheel is always constant, namely determined by the uninfluenced frequency of its oscillatory circuit; naturally this frequency must be equal for both oscillatory circuits, so that the phonic wheels rotate with equal speed when the velocity of the plane is constant.

Gears 27 and 28 have to rotate in opposite direction; this may, for instance, be attained by having rotate the phonic wheels 24 and 25 in opposite directions or by gears arranged between the phonic wheels 24 and 25 and gears 27, 28 respectively.

Rotation of gears 27 and 28 in opposite directions has the consequence that the planet wheel 29 remains in steady position until the speed of one of the gears 27 or 28 changes. Change, i. e. increase of speed, of one of the gears, e. g. gear 27, will move the planet wheel 29 in one direction, while increase of speed of the other gear, i. e. gear 28, will move the planet wheel in opposite direction. In view of the fact that these speed increases of the gears 27 and 28 respectively are proportional to the frequency variations of the frequency controlling means 22 and 23 and these frequency variations in turn are proportional to the acceleration and deceleration respectively of the airplane, the movement of planet wheel 29 will indicate the velocity variations of the airplane in a given direction and the position of this wheel will be correct and true indication of the absolute i. e. ground speed of the plane in this direction.

Figure 2:
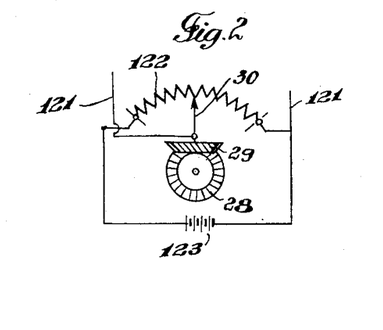
Fig. 2 is a cross-section through a detail of the diagrammatic view along line 2—2 of Fig. 1.

It is evident that electrical or mechanical indicating means 30 of the type shown in Fig. 1 may be connected with the planet wheel 29, indicating on dial 31 the absolute velocity, i. e., how many miles per hour the plane makes at any moment. Dial 31 is part of a voltmeter 120 which is included in circuit 121. As shown in Fig. 2, this circuit is combined with a variable resistance 122 and the indicating means, i. e. the moving contact serving as pointer 30, operated by the planet wheel 29. The source of current 123 is connected across the end terminals of the variable resistor 122. During turning of this planet wheel, the pointer 30 slides along the resistance 122 and thus varies the voltage indicated on dial 31 of the voltmeter 120. These variations are evidently proportional to the variations of the absolute velocity of the plane and thus the voltmeter will indicate directly the speed of the plane.

Although not explicitly mentioned, it is evident that the described speed indicator gives the fore and aft speed of the plane; the means for ascertaining the lateral speed i. e. drift of the plane are like those used for determining fore and aft speed. The only difference is that the drift indicating accelerometer 34 has to be responsive to lateral velocity variations while accelerometer 20 responds only to fore and aft velocity variations, i. e. to velocity variations in direction of the longitudinal axis of the plane. The frequency controlling means 35 and 36, the phonic wheels 37 and 38, the integrating differential arrangement 39, and the dial 40 for drift velocity indication do not differ from the corresponding parts of the above described fore and aft speed indicating means; their detailed description is therefore superfluous.

The gyroscope 21 carrying the accelerometers 20 and 34 may be combined with one or more inclinometers 43 of known type indicating on dial or dials 44 the angles of fore and aft and/or lateral inclinations of the plane.

Figure 3:
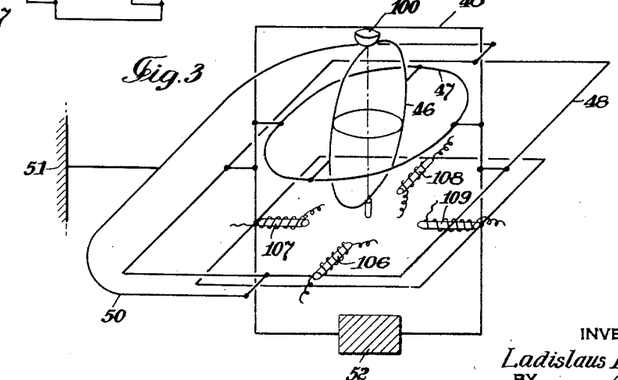
Fig. 3 is a diagrammatic view of the accelerometer carried by gyroscopic stabilizing means.
Figures 3A, 4:
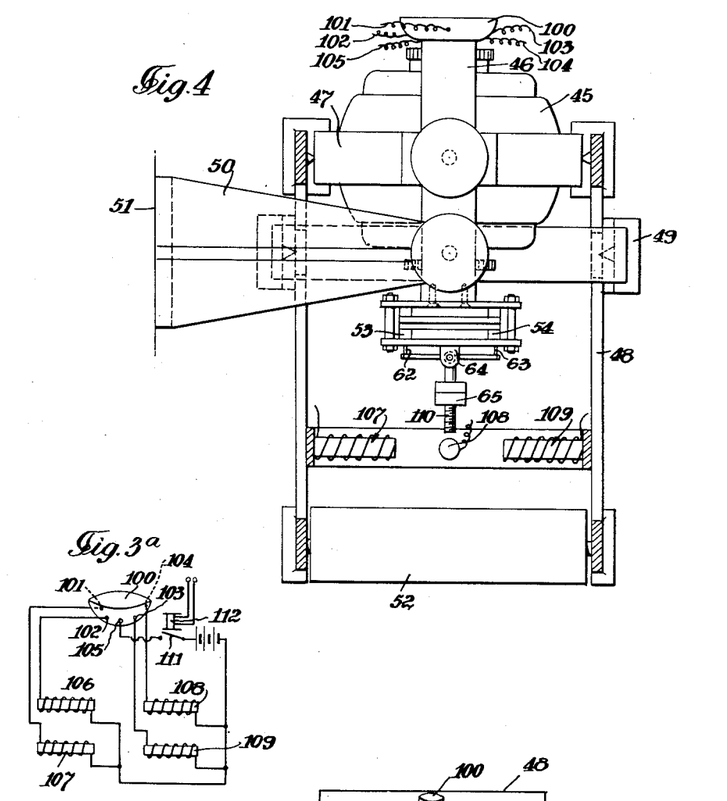
Fig. 3a is a diagrammatic view of correcting means for maintaining the spinning axis of the gyroscope in the true vertical.
Fig. 4 is a cross-section through a specific embodiment of the arrangement shown in Fig. 3.

Having thus described the main parts of my new apparatus in general I now will proceed with a detailed description of the new accelerometer and frequency controlling means used in combination with this apparatus:

Figures 3 and 4 show in detail how the accelerometer 20 is carried by the gyroscopic means 21. These gyroscopic means consist of a stabilizing gyroscope 45 having a vertical spinning axis and being suspended within a system of four gimbal rings 46, 47, 48 and 49. The outermost gimbal ring 49 is supported by frame 50; this frame is secured to the airplane fuselage 51.

In order to maintain the spinning axis of gyroscope 45 in the true vertical, correcting means have to be arranged which correct the position of this spinning axis each time it deviates from the true vertical. A preferred embodiment of such correcting means comprises a cup-like member 100 made of glass or similar insulating material and being preferably rigidly fixed to the vertical innermost gimbal ring 46. This cup contains mercury or a like liquid conducting material and has four electrodes 101, 102, 103 and 104 molded diagonally opposite to each other into its walls immediately above the surface of the mercury within the cup. A center electrode 105 at the bottom of the cup is arranged in such a way as to be in permanent contact with the mercury. Any deviation of the spinning axis of the gyroscope from the true vertical will move the mercury from its initial center position; each time this occurs the mercury will make contact between the central electrode 105 and one of the excentric electrodes 101, 102, 103 and 104.

These contact members, namely electrodes 101, 102, 103, 104 and electrode 105 respectively are included in circuits each adapted to energize one of the electro-magnets 106, 107, 108, and 109 mounted rigidly to the gimbal ring 48; this ring has a pendulous weight 52 arranged at its bottom. This pendulous weight has to be sufficiently heavy in order to stay in the true vertical whenever one of the above enumerated magnets is performing its function when energized. The function of the energized magnet consists of exerting attraction on the stabilizing rod 110 whereby the gyroscope's spinning axis will return into the true vertical by its characteristic precession.

It is obvious that this process of correcting and maintaining the spinning axis in the true vertical will become operative whenever the mercury moves from its initial position and produces a contact. However, other factors than deviation of the spinning axis of the gyroscope from the true vertical may move the mercury, as for instance accelerational or centrifugal forces acting on the mercury. In order to prevent the correcting device from becoming operative under such influences a switch 111 and a relay 112 are provided for disconnecting the electrodes in cup 100 from the electromagnets around the stabilizing rod 110, whenever any other, e. g. accelerational, decelerational or centrifugal forces are present. Presence of such forces is always indicated by the movement of one of the planet wheels such as the planet wheel 29 of the integrating differential arrangement 26. Means actuated by the movement of planet wheel 29 or by electrical impulses caused by accelerational or centrifugal forces are provided for operating relay 112 and opening thereby switch 111, whereby the correcting device becomes inoperative whenever accelerational, decelerational or centrifugal forces occur. Such means actuated by the movement of the planet wheel or by electrical impulses caused by accelerational or centrifugal forces may be switches of the most various well-known types which are closed or opened during movement of the planet wheel or by accelerational or centrifugal forces due to movement of the plane.

As shown in the drawings the accelerometer 20 is attached directly to the innermost gimbal ring 46. Thus this accelerometer is entirely independent from other influences than velocity variations of the plane.

Various embodiments of accelerometers can be used in combination with my present apparatus. However, I have found it especially advantageous to use an accelerometer in which velocity variations of the plane are translated into mechanical pressure variations, these mechanical pressure variations then translated into electrical pressure, i. e., voltage variations, and these voltage variations used to create in the above mentioned oscillatory circuits frequency variations corresponding to the velocity variations of the plane.

In such embodiments I preferably use for translating velocity variations into mechanical pressure variations a heavy inert mass so arranged as to be substantially prevented from moving but being only adapted to exert varying pressure against members with which it is permanently in contact; these pressure variations will be proportional to the velocity variations of the plane. For translating the thus caused mechanical pressure variations into electrical voltage variations piezo-electric elements, e. g. Rochelle salt or quartz crystals are used.

Figure 5:
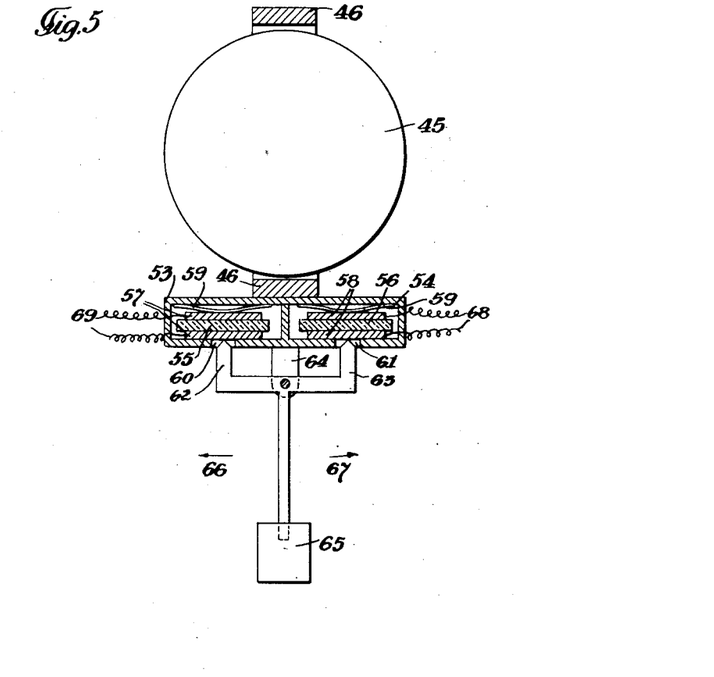
Fig. 5 is a cross-section through the accelerometer shown in Fig. 4.

In Figures 4 and 5 a practical embodiment of such an accelerometer is shown. Gimbal ring 46 carries the two box-shaped containers 53 and 54. Within each of these containers a piezoelectric element, e. g., a Rochelle or quartz crystal 55 or 56 and two electrodes 57 or 58 are arranged. Springs 59 are holding the electrodes 57 and 58 in close contact with opposite faces of crystals 55 and 56, respectively. In the bottom of containers 53 and 54 apertures 60 and 61, respectively, are arranged. Through these apertures lever arms 62 and 63 are projecting into the containers 53 and 54 and pressing against electrodes 57 and 58, respectively. Lever arms 62 and 63 form part of pendulum 65 which is suspended from the box-shaped containers by means of bearing-like lugs 64. This suspension is arranged in such a way that in steady position the points of both levers 62 and 63 are in contact with the corresponding electrodes 57 and 58, respectively, without pressing against the same.

The above described accelerometer operates in the following way:

Assumed the plane carrying the gyroscope and the accelerator is proceeding in direction of arrow 66, then acceleration of the plane will tend to move pendulum 65 in direction of arrow 67. This will result in pressure of lever 63 against electrode 58, increasing also the pressure exerted on the piezo-electrical crystal 56 and causing voltage variations in the electrical circuit 68. On the other hand deceleration of the plane will effect in the same manner voltage variations, e. g., voltage increases, in the electrical circuit 69.

Figure 6:
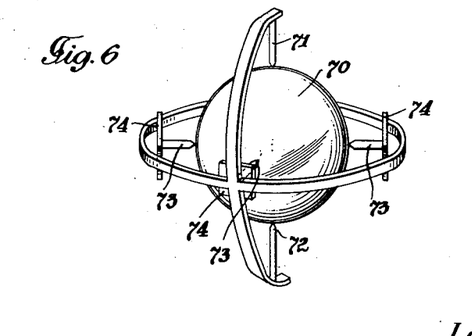
Fig. 6 is another embodiment of an accelerometer shown in perspective view.

While the above described pendulum arrangement may only be used for indicating acceleration and deceleration in one direction, it is possible to obtain indications of acceleration in any required number of directions in a horizontal plane by means of the arrangement shown in Fig. 6. In this arrangement a spherical heavy mass 70 is supported by vertically arranged pin-like upper and lower supports 71 and 72 and held in its position by pin-like members 73 arranged in a horizontal plane around this mass and connected with piezo-electric units 74 of the above described type.

Figure 7:
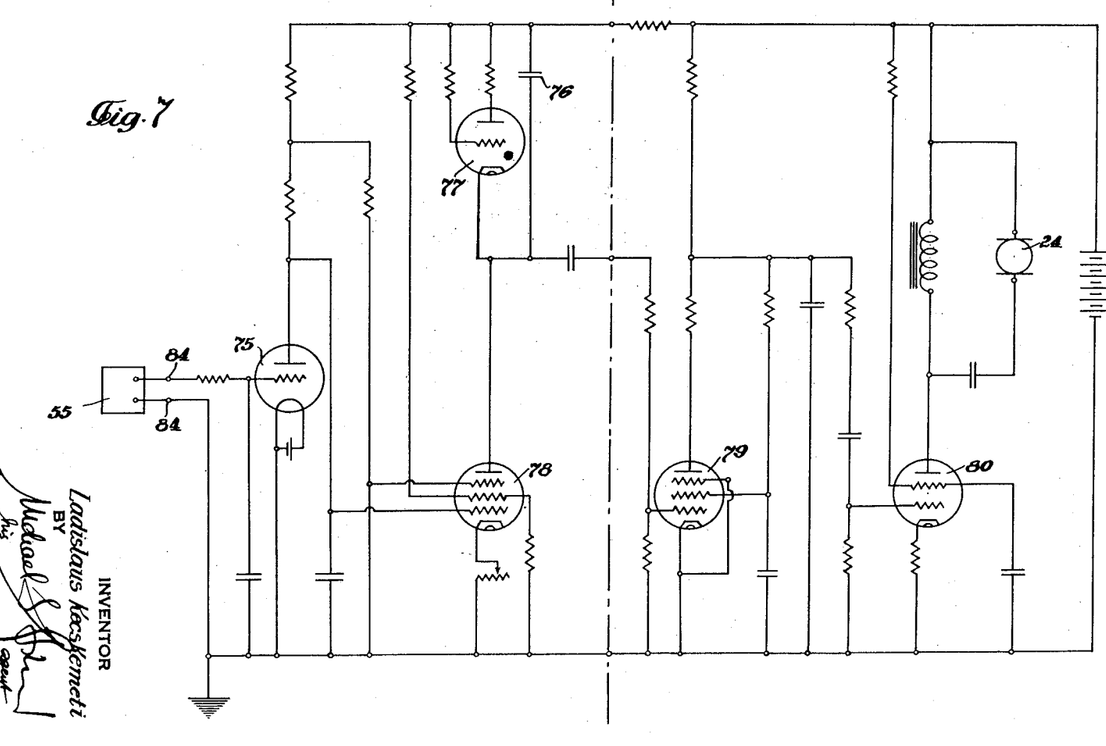
Fig. 7 is a diagram of the circuit arrangement of the frequency controlling and integrating means used for integrating with respect to time the velocity variations measured by the accelerometers shown in Figs. 4 to 6.

The above described means are adapted to translate the velocity variations, i. e., acceleration and deceleration of the airplane into mechanical pressure variations and these mechanical pressure variations into corresponding electrical voltage variations; in accordance with the present invention, additional means have to be provided to create in an oscillatory circuit frequency variations proportional to these voltage variations and thus also proportional to the velocity variations of the airplane. Such means to create in an oscillatory circuit frequency variations proportional to voltage variations are well-known to everybody skilled in this art and do not constitute an invention per se. Nevertheless, in order to give a complete description of all details of my new device, even the known ones, a practical embodiment of such means, designated above as "frequency controlling means 22 and 23," will be described below in detail:

As shown in Fig. 7, the voltage changes caused by the piezo-electric crystal 55 are first translated into current changes by means of a linear amplifier tube 75; this current charges a condenser 76. The condenser 76 discharges at a critical voltage and then the charging and discharging cycle recommences. A gas filled thyratron tube serving as relaxation oscillator 77 has the tube 78 included in its cathode line. Change of the impedance of tube 78 will vary the grid bias of the gas filled thyratron tube 77, thereby varying also its anode current; this will effect variation of the discharging time of condenser 76 which in turn will cause frequency variations of the oscillations. This controlled variable frequency will modulate the frequency of the oscillator tube 79; this oscillator tube in turn modulates the frequency of power tube 80 driving the synchronous motor, i. e. phonic wheel 24.

The above described frequency controlling means are adapted to be used in combination with a Rochelle salt crystal as piezo-electric element. In case a quartz crystal is used, certain changes have to be made. These changes consist in substituting for the Rochelle salt crystal a quartz crystal and the amplifying arrangement shown in Fig. 8. The reason for this substitution is that voltage outputs by a quartz crystal are very small and that therefore it is preferable to cause by pressure variations amplitude variations of the oscillations of the quartz crystal instead of current generation. For this purpose, quartz crystal 81 is held in constant oscillation at its natural frequency by means of oscillator tube 82. The output of tube 82 is rectified by means of the rectifier tube 83.

Figures 8, 9, 10, 11, 12:
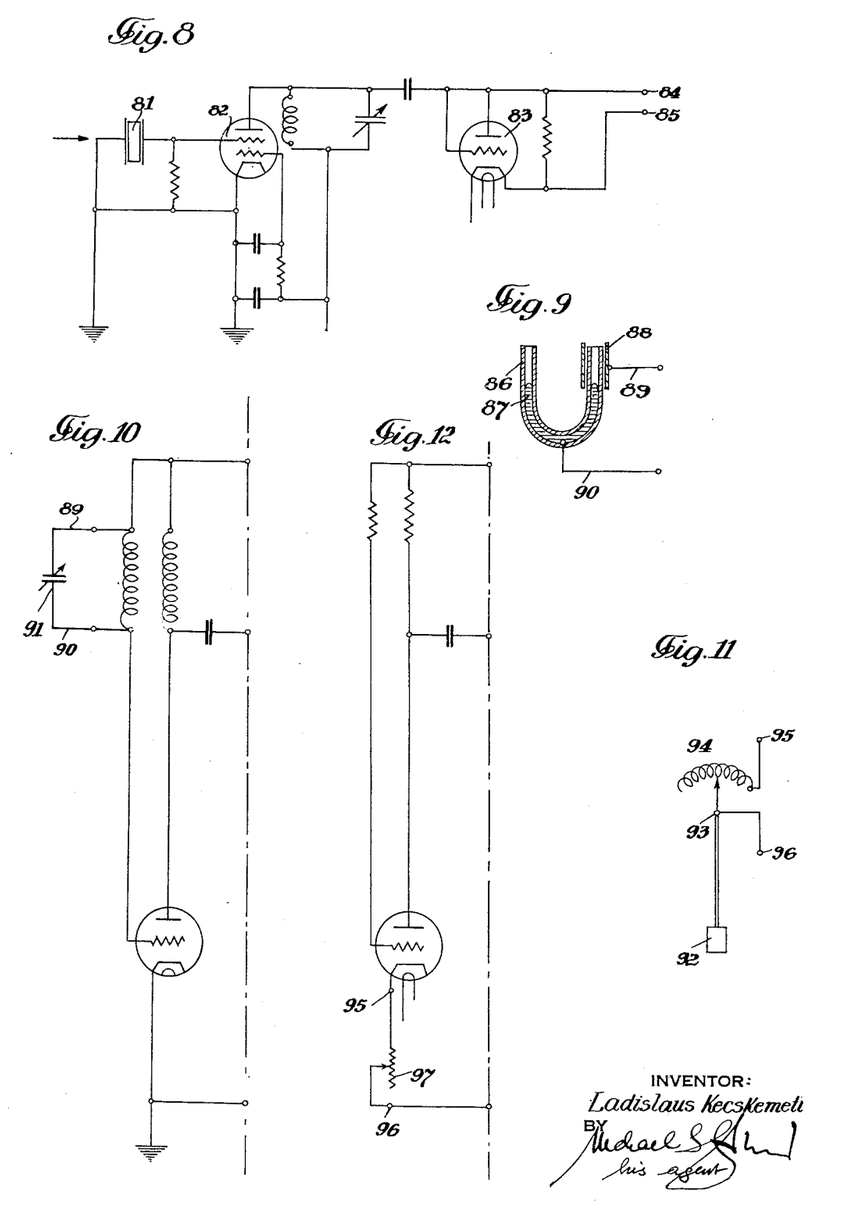
Fig. 8 is a modification of the frequency controlling and integrating circuit arrangement shown in Fig. 7.
Fig. 9 shows a modified accelerometer.
Fig. 10 is a modified detail of the frequency controlling and integrating circuit arrangement shown in Fig. 7, to be used in connection with the modified accelerometer shown in Fig. 9.
Fig. 11 shows still another modified accelerometer.
Fig. 12 is still another modified detail of the frequency controlling and integrating circuit arrangement shown in Fig. 7, to be used in connection with the accelerometer shown in Fig. 11.

This device operates as follows: The accelerometer provides a varying pressure, proportionate to the rate of acceleration, on the electrode 58; this pressure will reduce the amplitude of oscillation of the crystal 81, thereby varying the output proportionately. Thus the rectified output following rectifier tube 83 will have a varying voltage, i. e., this output will have D. C. voltage variations in direct proportion to the pressure applied at electrode 58. Terminals 84 and 85 are connected with the corresponding points of the circuit arrangement shown in Fig. 7; by means of this latter circuit arrangement the voltage variations at terminals 84 and 85 are translated into frequency variations in the way described above.

As already mentioned, it is possible to control by the velocity variations of the plane the capacity, inductance, or resistance of an electrical element instead of causing voltage variations in an electrical circuit; this varying capacity, inductance or resistance is then used for creating frequency variations in an oscillatory circuit. In the embodiment shown in Figs. 9 and 10, the velocity variations of the plane cause capacity variations of an electrical element; these capacity variations in turn effect frequency variations of an oscillatory circuit. For this purpose the U-shaped tube 86 shown in Fig. 9 is partly filled with mercury 87 and arranged in such a manner that in case of velocity variations of the plane the mercury in the tube is moved. A metallic sleeve 88, conductor 89 connected with this sleeve and conductor 90 connected with the mercury 87 in tube 86, form an electrical arrangement the capacity of which varies according to the movement of mercury 87.

This variable capacity indicated in Fig. 10 by numeral 91 is utilized to control the frequency of an oscillator which serves as modulator for the power tube of the synchronous motor 24. It should be noted that in Fig. 10 only part of the frequency controlling means is shown. The shown circuit has to be completed by that part of the circuit arrangement shown in Fig. 7 which is lying on the right side of the vertical dot-dash line shown in that figure.

In Figs. 11 and 12 another embodiment is shown in which resistance changes caused by acceleration and deceleration of the plane are translated into frequency variations. For translating the velocity variations into resistance variations the pendulum arrangement shown in Fig. 11 is used. In this arrangement pendulum 92 is turnably suspended at its pivoting point 93 and connected with resistance member 94 in such a manner that the resistance between points 95 and 96 varies according to the movement of pendulum 92. In view that the pendulum's movement is proportionate to the velocity variations of the plane, the resistance variations will also be a function of these velocity variations. In Fig. 12, this resistance controlling pendulum arrangement is designated with numeral 97 and the resistance variations are used for controlling the frequency of an oscillator which serves as modulator for the power tube of the synchronous motor 24. The circuit shown in this figure has also to be completed in the same way as the one shown in Fig. 10.

It will be understood that each of the elements described above, or two or more together, may also find a useful application in other accelerometers and velocity indicating devices differing from those described above.

While I have illustrated and described the invention as embodied in ground speed indicating apparatus I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. In an apparatus for measuring the velocity of a movable body, two electrical oscillatory circuits, influencing means adapted to create in one of said oscillatory circuits frequency variations being proportional to and dependent upon the rate of acceleration of said movable body in a certain direction, influencing means adapted to create in the other of said oscillatory circuits frequency variations being proportional to and dependent upon the rate of deceleration of said movable body in the same direction, both said influencing means operating in such a manner that accelerations and decelerations the absolute values of which are equal create in said oscillatory circuits frequency variations of equal magnitude and directed in the same direction, an integrating mechanism influenced by equal amounts but in opposite directions by equal frequency variations in said oscillatory circuits and adapted to integrate the frequency variations of both oscillatory circuits with respect to time, and means for indicating the thus obtained integrated products of said frequency variations and time, said integrated products being a measure of the velocity of said movable body.

2. In an apparatus for measuring the velocity of a movable body, two electrical oscillatory circuits, influencing means adapted to create in one of said oscillatory circuits frequency variations being proportional to and dependent upon the rate of acceleration of said movable body in a certain direction, influencing means adapted to create in the other of said oscillatory circuits frequency variations being proportional to and dependent upon the rate of deceleration of said movable body in the same direction, both said influencing means operating in such a manner that accelerations and decelerations the absolute values of which are equal create in said oscillatory circuits frequency variations of equal magnitude and directed in the same direction, and an integrating mechanism comprising two rotatable members, means controlled by one of said oscillatory circuits for rotating one of said members with a variable speed being proportional to the frequency variations of one of said oscillatory circuits, means controlled by the other of said oscillatory circuits for rotating the other of said members in the opposite direction with a variable speed being proportional to the frequency variations of the other of said oscillatory circuits, said rotatable members being equally but oppositely influenced by equal frequency variations of said oscillatory circuits and means controlled by said rotatable members and adapted to determine and indicate the time-integrated algebraic sum of said speeds of both said rotatable members which sum is a measure of the velocity of said movable body.

3. In an apparatus for measuring the velocity of a movable body, two electrical oscillatory circuits, influencing means adapted to create in one of said oscillatory circuits frequency variations being proportional to the rate of acceleration of said movable body in a certain direction, influencing means adapted to create in the other of said oscillatory circuits frequency variations being proportional to the rate of deceleration of said movable body in the same direction both said influencing means operating in such a manner that accelerations and decelerations the absolute values of which are equal create in said oscillatory circuits frequency variations of equal magnitude and directed in the same direction, and an integrating mechanism comprising two synchronous motors, means controlled by one of said oscillatory circuits for rotating one of said motors with a variable speed being proportional to the frequency variations of one of said oscillatory circuits, means controlled by the other of said oscillatory circuits for rotating the other of said motors in the opposite direction with a variable speed being proportional to the frequency variations of the other of said oscillatory circuits, a differential mechanism controlled by said motors and adapted to determine and indicate the time-integrated algebraic sum of said speeds of said motors which sum is a measure of the velocity of said movable body.

4. In an apparatus for measuring the velocity of a movable body, means for translating the rate of acceleration of said movable body in a certain direction into voltage variations of an electrical circuit, means for translating the rate of deceleration of said movable body in the same direction into voltage variations of another electrical circuit, two electrical oscillatory circuits, influencing means adapted to create in one of said oscillatory circuits frequency variations being proportional to the voltage variations of one of said electrical circuits, influencing means adapted to create in the other of said oscillatory circuits frequency variations being proportional to the voltage variations in the other of said electrical circuits, both said influencing means operating in such a manner that accelerations and decelerations the absolute values of which are equal create in said oscillatory circuits frequency variations of equal magnitude and directed in the same direction, an integrating mechanism influenced by equal amounts but in opposite directions by equal frequency variations in said oscillatory circuits and adapted to integrate the frequency variations of both oscillatory circuits with respect to time, and means for indicating the thus obtained integrated products of said frequency variations and time, said integrated products being a measure of the velocity of said movable body.

5. In an apparatus for measuring the velocity of a movable body, means for translating the rate of acceleration of said movable body in a certain direction into mechanical pressure variations, means for translating the rate of deceleration of said movable body in the same direction into mechanical pressure variation, means for translating one of said mechanical pressure variations into voltage variations of an electrical circuit, means for translating the other of said mechanical pressure variations into voltage variations of another electrical circuit, two electrical oscillatory circuits, influencing means adapted to create in one of said oscillatory circuits frequency variations being proportional to one of said voltage variations, influencing means adapted to create in the other of said oscillatory circuits frequency variations being proportional to the other of said voltage variations, both said influencing means operating in such a manner that accelerations and decelerations the absolute values of which are equal create in said oscillatory circuits frequency variations of equal magnitude and directed in the same direction, and an integrating mechanism comprising two synchronous motors, means controlled by one of said oscillatory circuits for rotating one of said motors with a variable speed being proportional to the frequency variations of one of said oscillatory circuits, means controlled by the other of said oscillatory circuits for rotating the other of said motors in the opposite direction with a variable speed being proportional to the frequency variations of the other of said oscillatory circuits, and a differential mechanism adapted to determine and indicate the time-integrated algebraic sum of said speeds of both said motors which sum is a measure of the velocity of said movable body.

6. In an apparatus for measuring the velocity of a movable body two electrical circuits, each of said electrical circuits including a piezo-electrical crystal adapted to vary the voltage of the respective electrical circuit with variations of mechanical pressure exerted on said crystal, means adapted to translate the rate of acceleration of said movable body in a certain direction into variations of mechanical pressure on one of said crystals, the electrical circuit in which said crystal is included thus having a voltage varying in accordance with the rate of acceleration of said movable body, means adapted to translate the rate of deceleration of said movable body into variations of mechanical pressure on the other of said crystals, the electrical circuit in which said crystal is included thus having a voltage varying in accordance with the rate of deceleration of said movable body, two electrical oscillatory circuits, means adapted to create in one of said oscillatory circuits frequency variations being proportional to the voltage variations of one of said electrical circuits, means adapted to create in the other of said oscillatory circuits frequency variations being proportional to the voltage variations in the other of said electrical circuits, two synchronous motors, means controlled by one of said oscillatory circuits for rotating one of said motors with a variable speed being proportional to the frequency variations of one of said oscillatory circuits, means controlled by the other of said oscillatory circuits for rotating the other of said motors with a variable speed being proportional to the frequency variations of the other of said oscillatory circuits, a differential mechanism comprising two motion transmitting rotatable members, one of said members rotated by one of said motors with a variable speed being proportional to the speed of said motor, the other of said members rotated by the other of said motors with a variable speed being proportional to the speed of said other motor, said motors and said motion transmitting rotatable members rotating with equal speed when the velocity of said movable body is constant, and at least one movable member being controlled only by said two motion transmitting rotatable members of said differential mechanism in such a manner as to be in a steady position while said rotatable members are rotating with equal speed and to move from this steady position, during variation of the speed of one or the other of said rotatable members, in one direction distances being proportional to the speed variations of one of said rotatable members and in opposite direction distances being proportional to the speed variations of the other of said rotatable members, said distances moved by said movable member from its steady position being a measure of the velocity of said movable body.

7. In an apparatus for measuring the velocity of a movable body, means for translating the rate of acceleration of said movable body in a certain direction into mechanical pressure varying in proportion to said rate of acceleration, means for translating the rate of deceleration of said movable body in the same direction into mechanical pressure varying in proportion to said rate of deceleration, two electrical oscillatory circuits, influencing means adapted to create in one of said oscillatory circuits frequency variations being proportional to and dependent upon one of said mechanical pressure variations, influencing means adapted to create in the other of said oscillatory circuits frequency variations being proportional to and dependent upon the other of said mechanical pressure variations, both said influencing means operating in such a manner that accelerations and decelerations the absolute values of which are equal create in said oscillatory circuits frequency variations of equal magnitude and directed in the same direction, an integrating mechanism influenced by equal amounts but in opposite directions by equal frequency variations in said oscillatory circuits and adapted to integrate the frequency variations of both oscillatory circuits with respect to time, and means for indicating the thus obtained integrated products of said frequency variations and time, said integrated products being a measure of the velocity of said movable body.

8. In an apparatus for measuring the velocity of a movable body, means for translating the rate of acceleration of said movable body in a certain direction into mechanical pressure varying in proportion to said rate of acceleration, means for translating the rate of deceleration of said movable body in the same direction into mechanical pressure varying in proportion to said rate of deceleration, two electrical oscillatory circuits, influencing means adapted to create in one of said oscillatory circuits frequency variations being proportional to and dependent upon one of said mechanical pressure variations, influencing means adapted to create in the other of said oscillatory circuits frequency variations being proportional to and dependent upon the other of said pressure variations, both said influencing means operating in such a manner that accelerations and decelerations the absolute values of which are equal create in said oscillatory circuits frequency variations of equal magnitude and directed in the same direction, and an integrating mechanism comprising two rotatable members, means controlled by one of said oscillatory circuits for rotating one of said members with a variable speed being proportional to the frequency of one of said oscillatory circuits, means controlled by the other of said oscillatory circuits for rotating the other of said members in the opposite direction with a variable speed being proportional to the frequency of the other of said oscillatory circuits, and a mechanism controlled by said rotatable members adapted to determine and indicate the time-integrated algebraic sum of said speeds of both said rotatable members, which sum is a measure of the velocity of said movable body.

9. In an apparatus for measuring the velocity of a movable body, means for translating the rate of acceleration of said movable body in a certain direction into mechanical pressure varying in proportion to said rate of acceleration, means for translating the rate of deceleration of said movable body in the same direction into mechanical pressure varying in proportion to said rate of deceleration, two electrical oscillatory circuits, influencing means adapted to create in one of said oscillatory circuits frequency variations being proportional to one of said mechanical pressure variations, influencing means adapted to create in the other of said oscillatory circuits frequency variations being proportional to the other of said mechanical pressure variations, both said influencing means operating in such a manner that accelerations and decelerations the absolute values of which are equal create in said oscillatory circuits frequency variations of equal magnitude and directed in the same direction, and an integrating mechanism comprising two synchronous motors, means controlled by one of said oscillatory circuits for rotating one of said motors with a variable speed being proportional to the frequency of one of said oscillatory circuits, means controlled by the other of said oscillatory circuits for rotating the other of said motors in the opposite direction with a variable speed being proportional to the frequency of the other of said oscillatory circuits, and a differential mechanism controlled by said motors and adapted to determine and indicate the time-integrated algebraic sum of said speeds of said motors, which sum is a measure of the velocity of said movable body.

10. In an apparatus for measuring the velocity of a movable body, means for translating the rate of acceleration of said movable body in a certain direction into mechanical pressure varying in proportion to said rate of acceleration, means for translating the rate of deceleration of said movable body in the same direction into mechanical pressure varying in proportion to said rate of deceleration, means for translating one of said mechanical pressure variations into voltage variations of an electrical circuit, means for translating the other of said mechanical pressure variations into voltage variations of another electrical circuit, two electrical oscillatory circuits, influencing means adapted to create in one of said oscillatory circuits frequency variations being proportional to the voltage variations of one of said electrical circuits, influencing means adapted to create in the other of said oscillatory circuits frequency variations being proportional to the voltage variations in the other of said electrical circuits, both said influencing means operating in such a manner that accelerations and decelerations the absolute values of which are equal create in said oscillatory circuits frequency variations of equal magnitude and directed in the same direction, an integrating mechanism influenced by equal amounts but in opposite directions by equal frequency variations in said oscillatory circuits and adapted to integrate the frequency variations of both oscillatory circuits with respect to time, and means for indicating the thus obtained integrated products of said frequency variations and time, said integrated products being a measure of the velocity of said movable body.

11. In an apparatus for measuring the velocity of a movable body, means for translating the rate of acceleration of said movable body in a certain direction into mechanical pressure varying in proportion to said rate of acceleration, means for translating the rate of deceleration of said movable body in the same direction into mechanical pressure varying in proportion to said rate of deceleration, means adapted to translate one of said mechanical pressure variations into variations of an electrical characteristic of an electrical element being proportional to and dependent upon said mechanical pressure variations, means adapted to translate the other of said mechanical pressure variations into variations of an electrical characteristic of another electrical element being proportional to and dependent upon said other mechanical pressure variations, two electrical oscillatory circuits, influencing means adapted to create in one of said oscillatory circuits frequency variations being proportional to and dependent upon the variations of said electrical characteristic of one of said electrical elements, influencing means adapted to create in the other of said oscillatory circuits frequency variations being proportional to and dependent upon the variations of said electrical characteristic of the other of said electrical elements, both said influencing means operating in such a manner that accelerations and decelerations the absolute values of which are equal create in said oscillatory circuits frequency variations of equal magnitude and directed in the same direction, and an integrating mechanism comprising two rotatable members, means controlled by one of said oscillatory circuits for rotating one of said members with a variable speed being proportional to the frequency variations of one of said oscillatory circuits, means controlled by the other of said oscillatory circuits for rotating the other of said members in the opposite direction with a variable speed being proportional to the frequency variations of the other of said oscillatory circuits, and a mechanism controlled by said rotatable members and adapted to determine and indicate the time-integrated algebraic sum of said speeds of said rotatable members, which sum is a measure of the velocity of said movable body.

LADISLAUS KECSKEMÉTI.